Dec. 6, 1955  F. C. NOVELLO  2,726,260
CYCLOHEXYLPHENYL METHYL KETONES
Filed May 17, 1951  2 Sheets-Sheet 1

Fig. I

B = Cl, I, Br

INVENTOR.
FREDERICK C. NOVELLO
BY Raymond Underwood
ATTORNEY

Dec. 6, 1955 F. C. NOVELLO 2,726,260
CYCLOHEXYLPHENYL METHYL KETONES
Filed May 17, 1951 2 Sheets-Sheet 2

INVENTOR.
FREDERICK C. NOVELLO
BY Raymond Underwood
ATTORNEY

United States Patent Office 2,726,260
Patented Dec. 6, 1955

2,726,260
CYCLOHEXYLPHENYL METHYL KETONES

Frederick C. Novello, Prospect Park, Pa., assignor to Merck & Co., Inc., a corporation of New Jersey Application May 17, 1951, Serial No. 226,813

8 Claims. (Cl. 260—483)

This application is concerned with certain new chemical compounds. It is more particularly concerned with compounds represented by the general formula

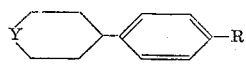

in which R is chosen from the group consisting of

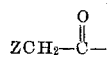

and

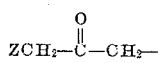

in which Z is chosen from the group consisting of chlorine, bromine, iodine hydroxy and acetoxy (which radicals can also be named as follows: the radical

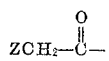

is also known as the chloroacetyl, bromoacetyl, iodoacetyl, hydroxyacetyl and the acetoxyacetyl radical, and the radical

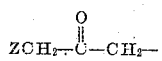

is also known as the chloroacetonyl, bromoacetonyl, iodoacetonyl, hydroxyacetonyl and the acetoxyacetonyl radical) and Y is chosen from the group consisting of

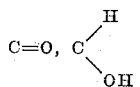

and groups convertible into the latter with the aid of hydrolysis. The groups hydrolyzable to a

can be represented by the ester or ether derivative thereof.

Figure 1:
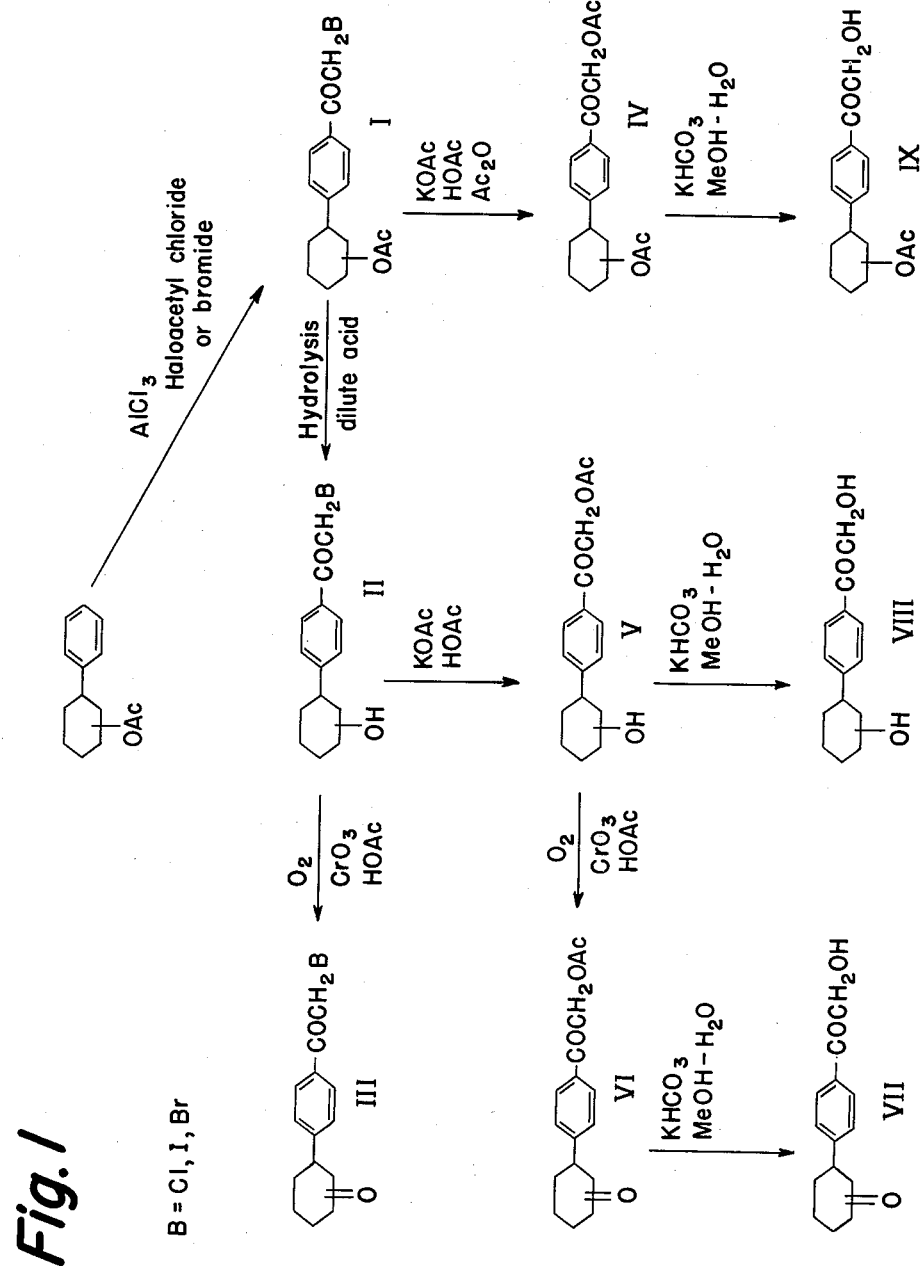

The compounds of the invention conveniently can be referred to broadly as cyclohexylphenyl methyl ketones and cyclohexylbenzyl methyl ketones. The compounds of the invention are prepared by the two series of reactions illustrated in Figures 1 and 2. Figure 1 illustrates the preparation of the various cyclohexylphenyl methyl ketones of the invention and Figure 2 illustrates the preparation of the various cyclohexylbenzyl methyl ketones of the invention.

As illustrated in Figure 1, the cyclohexylphenyl methyl ketones of the invention are prepared by starting with the known acetoxycyclohexylbenzenes and subjecting them to the Friedel-Crafts reaction with a haloacetyl chloride or bromide to yield compounds illustrated by I in which B is chosen from the group consisting of chlorine, bromine and iodine. It will be realized that the iodo compound is obtained by treatment of the chloro or bromo compound with sodium iodide in a suitable organic solvent. The hydroxycyclohexylphenyl halomethyl ketones (II) are obtained from I by hydrolysis in the presence of dilute acid. Oxidation of II with chromic oxide in acetic acid yields the ketocyclohexylphenyl halomethyl ketones (III). The acetoxycyclohexylphenyl acetoxymethyl ketones (IV) are obtained from I by treatment with potassium acetate in a mixture of acetic acid and acetic anhydride. The hydroxycyclohexylphenyl acetoxymethyl ketones (V) are obtained from II by treatment with potassium acetate in acetic acid. Oxidation of V with chromic oxide in acetic acid yields the ketocyclohexylphenyl acetoxymethyl ketones (VI). These ketones, upon treatment with potassium acid carbonate in aqueous methanol yield the ketocyclohexylphenyl hydroxymethyl ketones (VII). Similarly, treatment of V and IV with potassium acid carbonate in aqueous methanol yields respectively the hydroxycyclohexylphenyl hydroxymethyl ketones (VIII) and the acetoxycyclohexylphenyl hydroxymethyl ketones (IX).

Figure 2:
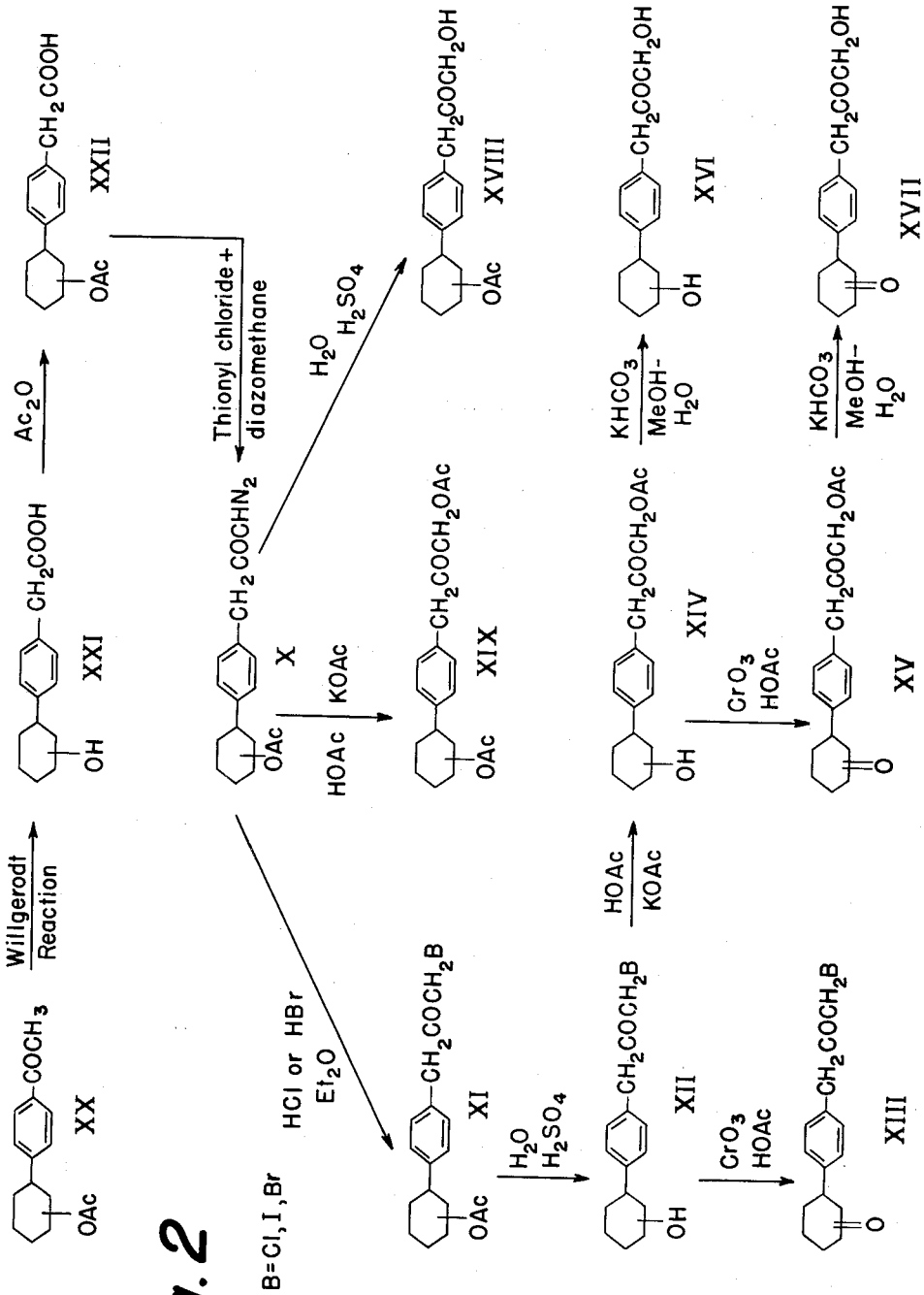

The various cyclohexylbenzyl methyl ketones of the invention are prepared, as illustrated in Figure 2, by starting with the acetoxycyclohexylbenzyl diazomethyl ketone (X). This compound is prepared by starting with the acetoxycyclohexylphenyl methyl ketone (XX) and subjecting it to the Willgerodt reaction which consists in refluxing the ketone with sulphur in morpholine, followed by hydrolysis with aqueous sodium hydroxide and treatment with acid to produce the acidic form. This yields the hydroxycyclohexylphenylacetic acid (XXI) which upon treatment with acetic anhydride yields the acetoxycyclohexylphenylacetic acid (XXII). XXII is converted to the diazo ketone by known procedures.

Treatment of X with hydrogen bromide or hydrogen chloride in ethereal solution yields the acetoxycyclohexylbenzyl halomethyl ketones XI in which Z is chlorine or bromine. When Z is iodine the compound can be obtained by treatment of the corresponding chloro or bromo compound with sodium iodide as before described. Hydrolysis of the XI yields the hydroxycyclohexylbenzyl halomethyl ketones (XII), which upon oxidation with chromic oxide in acetic acid solution yield the ketocyclohexylbenzyl halomethyl ketones (XIII).

The acetoxycyclohexylbenzyl acetoxymethyl ketones (XIX) of the invention are obtained by the reaction of X with potassium acetate in the presence of acetic acid. The hydroxycyclohexylbenzyl acetoxymethyl ketones (XIV) are obtained from XII by treatment with potassium acetate in the presence of acetic acid. Oxidation of XIV yields the various ketocyclohexylbenzyl acetoxymethyl ketones (XV).

The acetoxycyclohexylbenzyl hydroxymethyl ketones of the invention (XVIII) are obtained by hydrolysis of X in the presence of a strong acid such as sulfuric acid. By treatment of XIV and XV respectively with potassium acid carbonate in the presence of aqueous methanol there are obtained respectively the hydrocyclohexylbenzyl hydroxymethyl ketones (XVI) and the ketocyclohexylbenzyl hydroxymethyl ketones of the invention (XVII).

The details of the preparation of the various compounds of the invention will appear more clearly in the examples.

The compounds of the invention possess physiological activity. In particular, the chloromethyl and hydroxymethyl ketones of the invention possess activity similar to that exhibited by certain hormones from the adrenal cortex. The chloromethyl ketones possess particular utility. Further, the various ketones of the invention are useful as chemical intermediates for the preparation of a variety of compounds.

Example 1.—*Preparation of p-(2-acetoxycyclohexyl)-phenyl chloromethyl ketone.*—6.5 grams (0.03 mole) 2-acetoxycyclohexylbenzene and 15 ml. chloroacetyl chloride dissolved in 50 ml. carbon disulphide was cooled in ice and, over a fifteen minute period, treated with 9.4 grams (0.07 mole) aluminum chloride. The mixture was then stirred for six hours at 0° C. Then the mixture was poured onto 100 g. ice containing 25 ml. concentrated hydrochloric acid. The mixture was extracted with ether and the ether-carbon disulphide layer washed with two 50 ml. portions water, one 50 ml. portion 5% aqueous sodium hydroxide and finally with one 50 ml. portion water. The organic layer was dried over sodium sulphate and the solvent removed by distillation. The residual oil was distilled and there was obtained the desired product, p-(2-acetoxycyclohexyl)phenyl chloromethyl ketone.

Following the above procedure, and substituting for the 2-acetoxycyclohexylbenzene there used similar molar quantities of 3-acetoxycyclohexylbenzene and 4-acetoxycyclohexylbenzene, there were obtained respectively, p-(3-acetoxycyclohexyl)phenyl chloromethyl ketone and p-(4-acetoxycyclohexyl)phenyl chloromethyl ketone.

Further, following the procedure of Example 1 and substituting for the chloroacetyl chloride there used a similar molar quantity of bromoacetyl bromide, there was obtained p-(2-acetoxycyclohexyl)phenyl bromomethyl ketone. It will be realized that the 3- and 4-acetoxy isomers of this compound are obtained by starting with the appropriate 3- or 4-acetoxycyclohexylbenzene.

The p-(acetoxycyclohexyl)phenyl chloromethyl ketones, upon treatment with sodium iodide in acetone, yielded the three p-(acetoxycyclohexyl)phenyl iodomethyl ketones.

*Example 2.—Preparation of p-(2-hydroxycyclohexyl) phenyl chloromethyl ketone.*—5.0 grams (.02 mole) p-(2-acetoxycyclohexyl)phenyl chloromethyl ketone (obtained as in Example 1) was refluxed with 50 ml. ethanol and 5 ml. concentrated hydrochloric acid for approximately four hours and the mixture was evaporated to dryness in vacuo. The residue was taken up in 50 ml. ether, washed with two 25 ml. portions water, and evaporated to dryness. The residue was recrystallized from ethanol and there was obtained p-(2-hydroxycyclohexyl)phenyl chloromethyl ketone.

Similarly, following the above procedure, and starting with the 3- and 4-acetoxy isomers of p-(2-acetoxycyclohexyl)phenyl chloromethyl ketone (obtained as in Example 1) there were obtained respectively p-(3-hydroxycyclohexyl)phenyl chloromethyl ketone and p-(4-hydroxycyclohexyl)phenyl chloromethyl ketone.

It will be realized, that using the various bromomethyl ketones described in Example 1, and following the above outlined procedure, there are obtained the various p-(hydroxycyclohexyl)phenyl bromomethyl ketones. Having obtained the chloromethyl ketones as described above in this example, upon treatment with sodium iodide in acetone, there were obtained the various p-(hydroxycyclohexyl)phenyl iodomethyl ketones.

*Example 3.—Preparation of p-(2-ketocyclohexyl)phenyl chloromethyl ketone.*—5.0 grams (0.02 mole) p-(2-hydroxycyclohexyl)phenyl chloromethyl ketone (obtained as in Example 2) was dissolved in 100 ml. glacial acetic acid and treated with a solution of 2.66 g. chromic oxide in 300 ml. glacial acetic acid. After approximately 1 day at room temperature, the excess solvent was removed in vacuo and the residue treated with 50 ml. water and the solution extracted with 200 ml. ether. The ether layer was dried over sodium sulphate and evaporated to dryness. The residue was recrystallized from acetone and there was obtained the desired product, p-(2-ketocyclohexyl)phenyl chloromethyl ketone.

It will be realized that starting with the appropriate 3- or 4-hydroxycyclohexylphenyl chloromethyl ketone (the preparation of which is described in Example 2) there are obtained the 3- and 4-keto isomers of p-(2-ketocyclohexyl)phenyl chloromethyl ketone. The various p-(keto-cyclohexyl)phenyl bromomethyl ketones are prepared according to the foregoing procedure by starting with the p-(hydroxycyclohexyl)phenyl bromomethyl ketones (obtained as described in Example 2). The iodomethyl ketones were obtained by reacting the various bromomethyl ketones with sodium iodide as before described.

*Example 4.—Preparation of p-(2-acetoxycyclohexyl) phenyl acetoxymethyl ketone.*—18 grams (0.061 mole) p-(2-acetoxycyclohexyl)phenyl chloromethyl ketone (obtained as described in Example 1), 9.8 grams freshly fused potassium acetate, 150 ml. glacial acetic acid, and 150 ml. acetic anhydride was refluxed for approximately one day and concentrated to dryness in vacuo. The residue was admixed with 50 ml. water and 200 ml. ether. The ether and water layers were separated and the ether layer was then twice washed with 50 ml. portions water, dried over anhydrous sodium sulphate, and concentrated to dryness. Distillation of the residue yielded a yellow viscous oil, which slowly crystallized on long standing to an oily solid. Repeated crystallizations from acetone-petroleum ether yielded the desired product, p-(2-acetoxycyclohexyl)phenyl acetoxymethyl ketone, as glistening rhombic prisms.

The 3- and 4-acetoxy isomers of the foregoing compound are, of course, obtained by substituting in the foregoing procedure an equimolar quantity of the appropriate 3- or 4-acetoxy isomer of the p-(2-acetoxycyclohexyl) phenyl chloromethyl ketone there used.

*Example 5.—Preparation of p-(2-hydroxycyclohexyl) phenyl acetoxymethyl ketone.*—9.0 grams (0.036 mole) p-(2-hydroxycyclohexyl)phenyl chloromethyl ketone (obtained as described in Example 2), 4.9 grams freshly fused potassium acetate, and 75 ml. of glacial acetic acid was refluxed for approximately one day and concentrated to dryness in vacuo. The residue was admixed with 25 ml. water and extracted with 100 ml. ether. The ether layer was separated and washed twice with 25 ml. portions water, dried over anhydrous sodium sulphate, and concentrated to dryness. Distillation of the residue yielded the desired product, p-(2-hydroxycyclohexyl)phenyl acetoxymethyl keone.

Starting with the appropriate 3- or 4-hydroxy isomer of the p-(2-hydroxycyclohexyl)phenyl chloromethyl ketone above used, there were obtained the 3- and 4-hydroxy isomers of the desired product.

*Example 6.—Preparation of p-(2-ketocyclohexyl)phenyl acetoxymethyl ketone.*—5.0 grams (0.02 mole) p-(2-hydroxycyclohexyl)phenyl acetoxymethyl ketone (obtained as in Example 5) in 5 ml. glacial acetic acid, was treated with a solution of 1.4 grams chromic oxide in 300 ml. glacial acetic acid. The mixture was maintained for approximately one day at approximately 10° C. Then the excess solvent was removed in vacuo and the residue admixed with 50 ml. water and the mixture extracted with 200 ml. ether. The ether solution was separated, washed with two 50 ml. portions water, and dried over anhydrous sodium sulphate. The ether was removed by evaporation and the residue recrystallized from ether-petroleum ether. There was obtained the desired product, p-(2-ketocyclohexyl)phenyl acetoxymethyl ketone.

The 3- and 4-keto isomers of the foregoing compound were obtained by using as starting material the 3- and 4-hydroxy isomers of p-(2-hydroxycyclohexyl)phenyl acetoxymethyl ketone. The preparation of these compounds is described in Example 5.

*Example 7.—Preparation of p-(2-ketocyclohexyl)phenyl hydroxymethyl ketone.*—1.0 gram (0.0037 mole) p-(2-ketocyclohexyl)phenyl acetoxymethyl ketone (obtained as in Example 6) in 50 ml. methanol was treated with 1 gram potassium acid carbonate dissolved in 10 ml. water and 25 ml. methanol. After standing for approximately two days at room temperature the solution was concentrated to dryness in vacuo and the residue treated with 25 ml. dilute hydrochloric acid and extracted with 200 ml. ether. The ethereal solution was separated and washed with 25 ml. 5% sodium carbonate, and then with two 50 ml. portions water. The ethereal solution was dried over potassium carbonate, concentrated to approximately 10 ml., and diluted with sufficient petroleum ether to cause precipitation of the desired product, p-(2-ketocyclohexyl) phenyl hydroxymethyl ketone, which was obtained by filtration.

Starting with the 3- and 4-keto isomers of the p-(2-ketocyclohexyl)phenyl acetoxymethyl ketone above used, there were obtained the 3- and 4-keto isomers of the desired product.

*Example 8.—Preparation of p-(2-hydroxycyclohexyl)-phenyl hydroxymethyl ketone.*—Following the procedure outlined in Example 7 and substituting for the p-(2-ketocyclohexyl)phenyl acetoxymethyl ketone there used an equimolar quantity of p-(2-hydroxycyclohexyl)phenyl acetoxymethyl ketone (obtained as in Example 5), there was obtained the desired product, p-(2-hydroxycyclohexyl)phenyl hydroxymethyl ketone.

Similarly, the 3- and 4-hydroxy isomers of this compound were obtained by starting with the appropriate 3- or 4-hydroxy isomers of the starting material, p-(2-hydroxycyclohexyl)phenyl acetoxymethyl ketone.

*Example 9.—Preparation of p-(2-acetoxycyclohexyl)-phenyl hydroxymethyl ketone.*—Following the procedure outlined in Example 7 and substituting for the p-(2-ketocyclohexyl)phenyl acetoxymethyl ketone there used an equimolar quantity of p - (2 - acetoxycyclohexyl)phenyl acetoxymethyl ketone (obtained as in Example 4), there was obtained the desired product, p - (2 - acetoxycyclohexyl)phenyl hydroxymethyl ketone.

It will be realized that the 3- and 4-acetoxy isomers of the desired product can be obtained by starting with the 3- or 4-acetoxy isomer of the starting material, p-(2-acetoxycyclohexyl)phenyl acetoxymethyl ketone.

*Example 10.—Preparation of p-(4-acetoxycyclohexyl)-benzyl diazomethyl ketone.*—48 grams (0.185 mole) p-(4-acetoxycyclohexyl)-acetophenone (prepared by the Friedel-Crafts reaction of p-(4-acetoxycyclohexyl) benzene and acetyl chloride), 10 grams powdered sulphur and 100 ml. redistilled morpholine was refluxed for approximately seven hours, concentrated to dryness in vacuo and the residue refluxed for approximately seven hours in a mixture of 400 ml. 50% aqueous ethanol and 300 ml. 40% aqueous sodium hydroxide solution. The solution was concentrated to approximately 350 ml. and cooled whereupon the crystalline sodium salt of p-(4-hydroxycyclohexyl)phenylacetic acid separated. Upon recrystallization of the salt from water and subsequent liberation of the free acid, there was obtained p-(4-hydroxycyclohexyl)phenylacetic acid.

Three grams of this acid was suspended in 12 ml. acetic anydride and cooled in an ice bath. 6 drops concentrated sulphuric acid were added slowly with swirling. Complete solution was obtained in approximately 45 minutes and after standing at room temperature for an additional one and one-quarter hours with intermittent warming on the steam-bath, the mixture was poured into 120 ml. cold water. The product, which solidified on prolonged standing in the cold was collected, washed thoroughly with water, and dried in vacuo. Repeated crystallization from ethanol-water yielded p-(4-acetoxycyclohexyl)phenylacetic acid.

2.7 grams (0.01 mole) p-(4-acetoxycyclohexyl)phenylacetic acid was dissolved in 30 ml. dry benzene containing one drop pyridine and was treated with 5.5 ml. purified thionyl chloride. After 40 minutes at room temperature and approximately 5 minutes at 50° C. excess solvent and thionyl chloride were removed in vacuo at 50° C. The residue was dissolved in 5 ml. dry benzene and concentrated to dryness in vacuo at 50° C. This acid chloride was dissolved in 25 ml. absolute ether and added to a cold solution (approximately 0°) of diazomethane in 60 ml. absolute ether. After approximately one hour at room temperature gas evolution had ceased and the solvent and excess diazomethane were removed in vacuo at room temperature. Recrystallization of the residue from ether-petroleum ether yielded the desired product p-(4-acetoxycyclohexyl)benzyl diazomethyl ketone.

The 2- and 3-acetoxy isomers of the foregoing compound were obtained by starting with the 2- and 3-acetoxy isomers of the starting material, p-(4-acetoxycyclohexyl)-acetophenone and following the foregoing procedure.

*Example 11.—Preparation of p-(4-acetoxycyclohexyl)-benzyl chloromethyl ketone.*—3.0 grams of the diazo ketone (prepared as in Example 10) was dissolved in 50 ml. absolute ether and cooled in ice and then treated with dry hydrogen chloride until the vigorous evolution of nitrogen ceased (approximately 10 minutes). The solvent was removed by distillation and the dark red residue dried in vacuo on a steam-bath, after which it was recrystallized from ether-petroleum ether. There was obtained p-(4-acetoxycyclohexyl)benzyl chloromethyl ketone.

The 2- and 3-acetoxy isomers of the foregoing compound were obtained by starting with the 2- and 3-acetoxy isomers of the diazo ketone, prepared as in Example 10.

Further, following the foregoing procedure and substituting for the hydrogen chloride there used hydrogen bromide, there was obtained p-(4-acetoxycyclohexyl) benzyl bromomethyl ketone. The iodomethyl ketone was obtained by treating an acetone solution of the chloromethyl ketone with sodium iodide.

*Example 12.—Preparation of p-(4-hydroxycyclohexyl)-benzyl chloromethyl ketone.*—2.8 grams (0.091 mole) p-(4-acetoxycyclohexyl)benzyl chloromethyl ketone (obtained as in Example 11) in 70 ml. alcoholic hydrochloric acid (18:1) was refluxed for 1½ hours and concentrated to dryness in vacuo. Crystallization of the residue from ether-petroleum ether yielded the desired product p-(4-hydroxycyclohexyl)benzyl chloromethyl ketone.

The bromo isomer of the foregoing chloromethyl ketone was obtained according to the foregoing procedure by starting with the bromomethyl isomer of the p-(4-acetoxycyclohexyl)benzyl chloromethyl ketone (obtained as described in Example 11). The iodomethyl isomer was obtained by treatment of the bromomethyl isomer in acetone with sodium iodide.

It will be realized that the 2- and 3-hydroxy isomers of the foregoing compounds are obtained according to this procedure by starting with the appropriate 2- or 3-isomer of the above described starting materials.

*Example 13.—Preparation of p - (4 - ketocyclohexyl)-benzyl chloromethyl ketone.*—1.0 gram (0.0038 mole) p-(4-hydroxycyclohexyl)benzyl chloromethyl ketone (obtained as in Example 12) was dissolved in 5 ml. glacial acetic acid and the solution cooled to approximately 15° C. Over a two hour period this mixture was treated with a solution of 0.25 gram chromic oxide in 4 ml. water and 26 ml. glacial acetic acid. After approximately 20 hours at 10° C. the solution was concentrated to dryness in vacuo and the residue admixed with 25 ml. water and extracted with 50 ml. ether. The ether solution was washed twice with 25 ml. portions of water and dried over sodium sulphate after which the solution was concentrated to approximately 10 ml. and diluted with sufficient petroleum ether to cause precipitation. The precipitate was separated by filtration and recrystallized from ether-petroleum ether or acetone-petroleum ether. There was obtained the desired product p-(4-ketocyclohexyl)benzyl chloromethyl ketone.

The bromomethyl isomer of the foregoing compound was obtained by starting with the bromomethyl isomer of the p-(4-hydroxycyclohexyl)benzyl chloromethyl ketone starting material (obtained as described in Example 12). The iodomethyl isomer was obtained by treating an acetone solution of the bromomethyl isomer with sodium iodide.

Further, the 2- and 3-keto isomers of the foregoing compounds were obtained by starting with the appropriate 2- or 3-hydroxy isomer of the p-(4-hydroxycyclohexyl) benzyl chloromethyl ketone (obtained as described in Example 12) and following the above outlined procedure.

*Example 14.—Preparation of p-(4-hydroxycyclohexyl)-benzyl acetoxymethyl ketone.*—16.0 grams (0.061 mole) p-(4-hydroxycyclohexyl)benzyl chloromethyl ketone (obtained as in Example 12), 9.8 grams freshly fused potassium acetate, and 300 ml. glacial acetic acid was refluxed for approximately one day and concentrated to dryness in vacuo. The residue was admixed with 50 ml. water and extracted with 200 ml. ether. The ether layer was washed twice with 50 ml. portions water, dried over sodium sulphate, and concentrated to dryness. Vacuum distillation of the residue yielded the desired product p-(4-hydroxycyclohexyl)benzyl acetoxymethyl ketone.

The 2- and 3-hydroxy isomers of the foregoing compound were obtained by following the above procedure and utilizing as a starting material the appropriate 2- or 3-isomer of the p-(4-hydroxycyclohexyl)benzyl chloromethyl ketone (obtained as in Example 12).

*Example 15.—Preparation of p-(4-ketocyclohexyl)-benzyl acetoxymethyl ketone.*—Following the procedure outlined in Example 13 and substituting for the p-(4-hydroxycyclohexyl)benzyl chloromethyl ketone there used an equimolar quantity of p-(4-hydroxycyclohexyl)benzyl acetoxymethyl ketone (obtained as in Example 14) there was obtained the desired product, p-(4-ketocyclohexyl)-benzyl acetoxymethyl ketone.

The 2- and 3-keto isomers of the foregoing compound were prepared following the above procedure and substituting the appropriate 2- or 3-hydroxy isomer of the foregoing starting material.

*Example 16.—Preparation of p-(4-hydroxycyclohexyl)-benzyl hydroxymethyl ketone.*—Following the procedure outlined in Example 8 and substituting for the p-(2-hydroxycyclohexyl)phenyl acetoxymethyl ketone there used an equimolar quantity of p-(4-hydroxycyclohexyl)benzyl acetoxymethyl ketone (obtained as in Example 14), there was obtained the desired product, p-(4-hydroxycyclohexyl)benzyl hydroxymethyl ketone.

The 2- and 3-hydroxycyclohexyl isomers of the desired product were obtained by following the above outlined procedure and utilizing the appropriate 2- or 3-hydroxycyclohexyl isomer of the foregoing starting material.

*Example 17.—Preparation of p-(4-ketocyclohexyl)-benzyl hydroxymethyl ketone.*—Following the procedure outlined in Example 7, and substituting for the p-(2-ketocyclohexyl)phenyl acetoxymethyl ketone there used an equimolar quantity of p-(4-ketocyclohexyl)benzyl acetoxymethyl ketone (obtained as in Example 15), there was obtained the desired product, p-(4-ketocyclohexyl)-benzyl hydroxymethyl ketone.

Similarly, the 2- and 3-keto isomers of the desired compound were obtained by following the above outlined procedure and utilizing the appropriate 2- or 3-keto isomer of the foregoing starting material.

*Example 18.—Preparation of p-(4-acetoxycyclohexyl)-benzyl hydroxymethyl ketone.*—1.0 gram (0.003 mole) p-(4-acetoxycyclohexyl)benzyl diazomethyl ketone (obtained as in Example 10) was dissolved in 10 ml. dioxane and treated with 10 ml. 2 N sulphuric acid at room temperature. A slow evolution of nitrogen began immediately. After approximately one-quarter hour at room temperature and approximately one-half hour at 40° C. the mixture was diluted with 25 ml. water and extracted with 100 ml. ether. The ether extract was separated, washed twice with 25 ml. water, then with 25 ml. saturated sodium bicarbonate, finally with 25 ml. water and was dried over sodium sulphate. The sodium sulphate was removed by filtration and the solution concentrated to dryness in vacuo. The residue was crystallized from ether-petroleum ether and there was obtained the desired product p-(4-acetoxycyclohexyl)benzyl hydroxymethyl ketone.

The 2- and 3-acetoxy isomers of the foregoing compound were obtained by following the above outlined procedure and utilizing as starting materials and 2- and 3-acetoxy isomers of the diazo ketone utilized as a starting material herein.

*Example 19.—Preparation of p-(4-acetoxycyclohexyl)-benzyl acetoxymethyl ketone.*—2.7 grams (0.01 mole) p-(4-acetoxycyclohexyl)benzyl diazomethyl ketone (obtained as in Example 10) was dissolved in 10 ml. glacial acetic acid and warmed on a steam-bath for approximately one-half hour at which time gas evolution had ceased. A few crystals of fused potassium acetate were then added and the heating continued for approximately one hour after which the solution was cooled, poured into 50 ml. water and the water solution extracted with 200 ml. ether. The ether solution was separated, washed twice with 50 ml. portions water and dried over anhydrous sodium sulphate. The dried ethereal solution was concentrated to approximately 10 ml. and diluted with sufficient petroleum ether to cause precipitation. The precipitate was separated by filtration. This precipitate, the desired product, p-(4-acetoxycyclohexyl)benzyl acetoxymethyl ketone, can be further purified by distillation in vacuo. Repeated recrystallization from ether-petroleum ether yields glistening, colorless plates.

The 2- and 3-acetoxy isomers of the desired product were obtained by following the above outlined procedure and utilizing as starting materials the 2- and 3-acetoxy isomers of the diazo ketone used as a starting material.

It will be realized that in the foregoing examples there can be substituted for the acetoxy substituent in the cyclohexyl ring other substituents which are convertible into a hydroxy group with the aid of hydrolysis. Such radicals as benzoxy and lower acyloxy are illustrative of esters which can be hydrolyzed to yield the hydroxy group while lower alkoxy groups illustrate ether linkages which can be hydrolyzed to yield the hydroxy group.

What is claimed is:

1. A compound having the formula

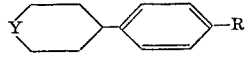

wherein Y is chosen from the group consisting of

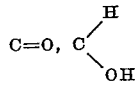

and ester and ether derivatives of the latter, and R is chosen from the group consisting of chloroacetyl, bromoacetyl, iodoacetyl, chloroacetonyl, bromoacetonyl and iodoacetonyl.

2. Compounds of the formula

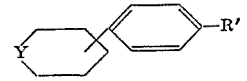

wherein Y is chosen from the group consisting of C=O and

and ester and ether derivatives of the latter, and R′ is chosen from the group consisting of

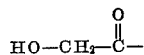

and

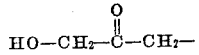

3. Compounds of the formula

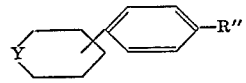

wherein Y is chosen from the group consisting of C=O and

and ester and ether derivatives of the latter, and R″ is chosen from the group consisting of

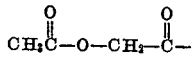

and

4. p-(2-acetoxycyclohexyl)phenyl chloromethyl ketone.
5. p-(2-acetoxycyclohexyl)phenyl hydroxymethyl ketone.
6. p-(4-acetoxycyclohexyl)phenyl hydroxymethyl ketone.
7. p-(4-hydroxycyclohexyl)benzyl chloromethyl ketone.
8. p-(4-hydroxycyclohexyl)benzyl hydroxymethyl ketone.

References Cited in the file of this patent
UNITED STATES PATENTS
2,326,222   Hopff et al. _____ Aug. 10, 1943